United States Patent [19]

Cote

[11] Patent Number: 5,759,388
[45] Date of Patent: Jun. 2, 1998

[54] POOL SKIMMER WITH SAFETY DISCONNECT MEANS

[76] Inventor: Paul L. Cote, 18 Valleyview Rd., Knowlton, Quebec, Canada, J0E 1V0

[21] Appl. No.: 800,657

[22] Filed: Feb. 4, 1997

Related U.S. Application Data

[63] Continuation of Ser. No. 521,916, Aug. 31, 1995, abandoned, which is a continuation-in-part of Ser. No. 305,289, Sep. 14, 1994, abandoned, which is a continuation-in-part of Ser. No. 124,465, Sep. 22, 1993, abandoned.

[51] Int. Cl.⁶ ..................................................... B01D 35/05
[52] U.S. Cl. ..................... 210/169; 210/242.1; 210/470; 4/490; 4/496
[58] Field of Search ........................... 210/169, 776, 210/242.1, 470, 499, 923; 4/490, 496; 15/1.7; 24/115 R, 129 R, 130, 136 R, 115 F

[56] References Cited

U.S. PATENT DOCUMENTS 4,089,074  5/1978  Sermons.

Primary Examiner—Robert Popovics
Attorney, Agent, or Firm—Eric Fincham

[57] ABSTRACT

A device for use in a generally round or oval swimming pool or like body of water wherein a generally circular flow of water proximate the periphery of the pool occurs, the device comprising a preferably floatable skimming device having a water inlet and a water outlet with filter means between the inlet and outlet such that the flow of water tends to pass through the filter means, and means for securing the device to a fixed point to allow the water inlet to be situated such that the circular flow of water enters the inlet.

13 Claims, 4 Drawing Sheets

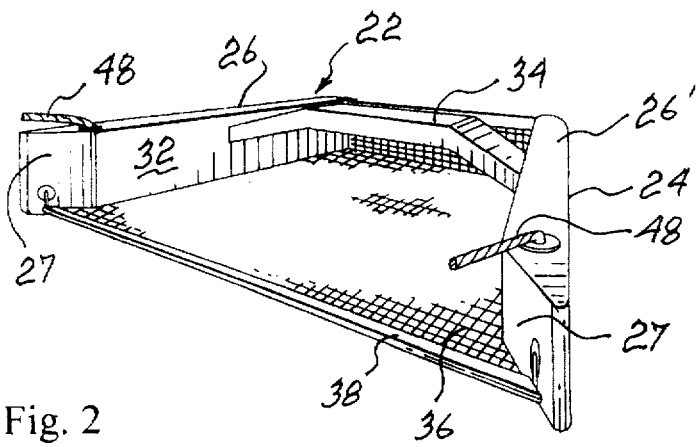
Fig. 2
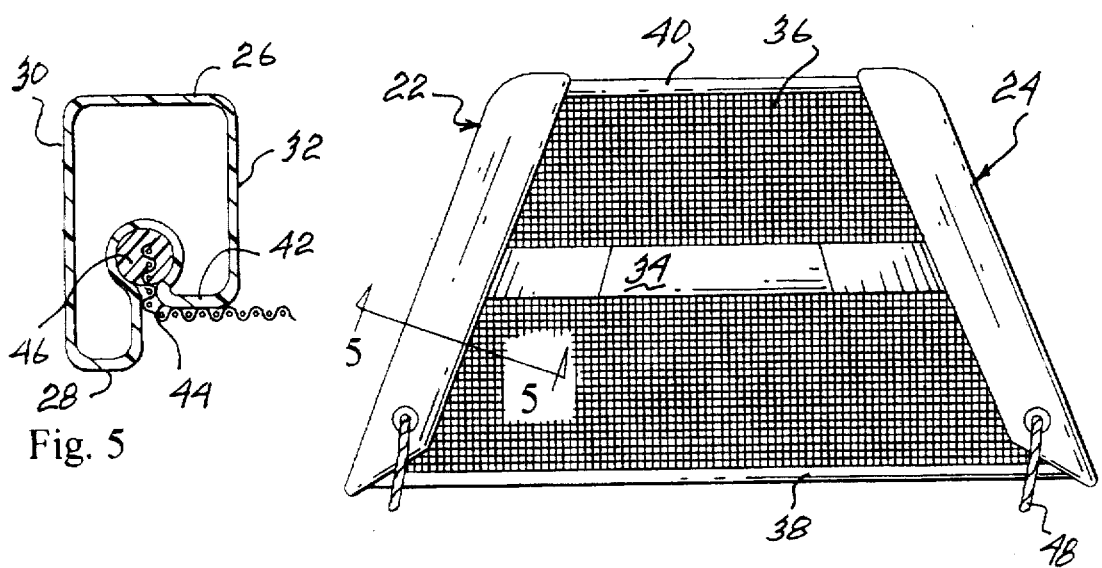
Fig. 5
Fig. 3
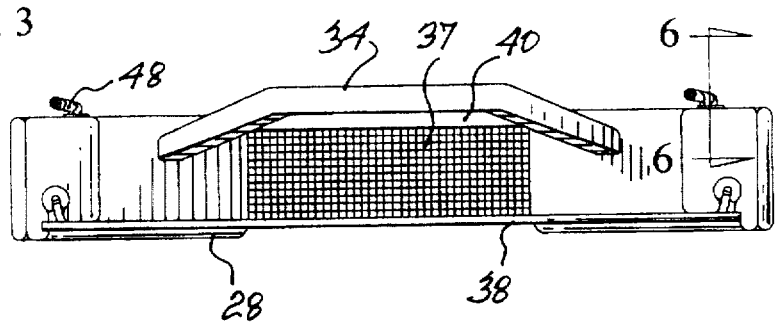
Fig. 4

POOL SKIMMER WITH SAFETY DISCONNECT MEANS

BACKGROUND OF THE INVENTION

The present application is a continuation of application Ser. No. 08/521,916 filed Aug. 31, 1995, now abandoned, which in turn is a continuation-in-part of application Ser. No. 08/305,289 filed Sep. 14, 1994, now abandoned, which is in turn a continuation-in-part of application Ser. No. 08/124,465 filed Sep. 22, 1993, now abandoned.

The present invention relates to a pool skimmer and more particularly, relates to a pool skimmer which is particularly suitable for use in pools wherein a peripheral flow of water occurs.

The problem of pool cleanliness is a continual one for pool owners and there are several different systems and devices presently utilized to assist in pool cleaning. Recognizing that debris originally falls on the surface of the water, there has traditionally been provided a water intake known as a skimmer located proximate the surface of the water. The skimmer intake for the water is normally located in the wall of the pool. At this point, the water is then pumped to a filter subsequent to which the water is returned to the pool.

Material which is not picked up by the skimmer filter normally will sink to the bottom of the pool where it must be removed by vacuuming. Several types of vacuums are well known including the robot vacuums which function to sweep or clean the bottom and/or side of the pool. In many climates, the bottom of the pool must be vacuumed at least every few days in order to maintain pool cleanliness.

It would obviously be desirable to minimize the amount of material falling to the bottom of the pool and accordingly to minimize the required vacuuming of the pool. To this end, conventional pools have the skimmer filter placed in the side wall of the pool. However, it has been found that a minimal amount of surface debris is removed by the conventional side wall skimmer filter inlet. It is also known in the art to provide different types of skimmers which are floatable and utilize a net to collect surface debris. Such skimmers are shown in, for example, U.S. Pat. Nos. 4,053,412; 4,089,074 and 4,518,495. These patents show skimmers which may be operated by a pole or alternatively, attached to a pool.

While such floatable skimmers do assist in removing surface debris, they can potentially represent a hazard for swimmers. Furthermore, it would be desirable to have a skimmer which is suitable for many different types of pools and has enhanced features.

SUMMARY OF THE INVENTION

It is an object of the present invention to provide a pool skimmer which is operative to remove much of the material from the surface of the pool prior to the material sinking to the bottom. It is a further object of the present invention to provide a floatable pool skimmer for use in pools which will utilize the natural circulation of the water to remove debris from the surface thereof.

It is a further object of the present invention to provide a floatable pool skimmer which is adaptable for many different types of pools.

It is a still further object of the present invention, to provide a floatable pool skimmer having enhanced safety features.

It is a still further object of the present invention to provide a floatable pool skimmer wherein the frame portion of the skimmer provides the flotation.

Still further, it is an object of the present invention to provide a floatable pool skimmer wherein a skimmer is designed to maximize the drag force thereon to thus position the skimmer in the desired location.

It is a still further object of the present invention to provide a floatable pool skimmer which maximizes its ease of use.

It is a further object of the present invention to provide a pool skimmer which can be shipped in knock down condition and assembled by the user.

According to the present invention, there is provided a device for use in a swimming pool or like body of water, the device comprising a water inlet and a water outlet, and having filter means placed between the water inlet and water outlet. The device is preferably designed to be floatable proximate the surface of the water. There is also included means for securing the device to a fixed point such that when the device is so secured, the flow of water set up in the pool passes into the water inlet, through the filter means and exits from the water outlet to thereby provide filtering of the water.

The invention will be described with respect to swimming pools and particularly swimming pools wherein a peripheral flow of water occurs. The invention, however, may also find use in bodies of water which do not necessarily have the peripheral flow of water as will be understood from the description hereinbelow.

In greater detail, it has been found that in most swimming pools, and particularly wherein there is established a generally peripheral circulation of the water proximate the periphery of the pool as a result of water being pumped through a central filter and returned to the pool through outlets proximate the side wall of the pool, this generally peripheral flow entrains most of the debris falling into the pool and tends to advance it in the same direction. By utilizing a filtering or screening device adapted to permit the surface water to flow therein and to filter the same, one is able to capture a substantial portion of the debris falling into the pool before it sinks to the bottom, this debris including material such as leaves, insects, etc.

The generally peripheral flow in the pool is established in a conventional manner wherein one has an intake in the pool for removing water and pumping it through a central filter means such as a sand filter and then pumping the water back to the pool. Apart from filtering at this point of time, other operations such as chlorination or the like may occur. The water is returned to the pool through one or more outlets proximate the pool periphery which sets up the peripheral flow in the pool.

The device of the present invention incorporates a water inlet which is situated such that the top layer of water in the pool will enter therein for filtering. To this end, the water inlet will have a certain width and will preferably extend below the surface for a relatively small distance. Naturally, it could extend below the surface to a greater depth but this does not provide any additional capability since the purpose of the device is to remove the material on the surface of the water. To this end, the device may have a water inlet extending to a depth of approximately between ½ to 2 inches.

The surface layer of the water, after entering the inlet, is then filtered; to this end the filter per se may be selected from any number of known types of suitable filters and, could include various screen/mesh types of material. After passing through the filter, the water continues through a water outlet to be returned to the pool.

The device is constructed so as to float on the surface and position the water inlet in the desired orientation. In a preferred embodiment, the device is constructed using the frame of the structure as its flotation means. This arrangement permits a very simple and cost effective device which has the necessary rigidity and can be engineered to provide the desired characteristics. In this embodiment, the device does not require the use of supplemental floats and/or the like. As will be discussed hereinbelow in greater detail, several considerations must be taken into account to engineer the product to have the desired characteristics. Included in these characteristics would be the desirability of having the water inlet extending approximately between ½ to 2" in depth.

The frame or housing forming a portion of the device, in a preferred embodiment, will utilize first and second longitudinally extending side members, each side member having a leading end, a trailing end, an upper surface and a lower surface. The side members define, between their leading ends, the water inlet while the water outlet is proximate the trailing ends.

Each side member forms a portion of the frame or housing and as such, is engineered, in combination with the other components, to provide a desired buoyancy to the device. Each side member can be made of a number of suitable materials with preferred materials either being a closed cell foam material or alternatively, a plastic material having one or more buoyancy chambers therein.

Each side member may have a desired structure and configuration. Thus, the side members may have any desired cross sectional configuration and likewise, may be formed of one or more different elements suitably secured together.

In one particularly preferred embodiment, each of the side members will be substantially identical and thus are interchangeable. In this embodiment, each side member may be made up of two half shells which also are substantially identical. Means for securing the half shells together are provided.

The first and second side members are interconnected at one or more points. In a preferred embodiment, they are interconnected between the upper surfaces thereof and which interconnection functions as a handle. In this embodiment, preferably the handle and/or interconnecting means are such that when the device is held by the same, the trailing ends of the side members tend to tilt downwardly or in other words, the handle is located forward of the center of gravity for reasons which will become apparent hereinbelow.

In a particularly preferred embodiment, the handle will also function as a means for tensioning the filtering screen when the product is assembled.

The side members are angled with respect to each other such that the distance between the leading ends is greater than the distance between the trailing ends or in other words, the water inlet has a greater cross sectional area than the water outlet. This, in combination with the fact that the side members are immersed in the water and extend both below and above the water line will thus create a drag force thereon. This drag force is important in maintaining the orientation of the device. In order to increase the drag force to a greater degree, one may also angle or taper the leading ends which also has the advantage of increasing the turbulence of the water thereat to prevent escape of any debris from the device.

The filtering means, as previously mentioned, may be formed of any suitable screen or mesh or indeed, can consist of any material having apertures therein sufficient to permit the flow of water therethrough. In a preferred embodiment, a suitable fine flexible mesh screen sufficient to retain the debris is employed. The screen extends in a more or less vertical orientation between the side members and is somewhat adjacent the trailing ends. It may also extend between the side members in a horizontal plane such that it forms the bottom with it being spaced a suitable distance below the surface of the water as previously mentioned. A reinforcing element may be used on the leading edge of the screen; a similar reinforcing element may also be used on the trailing edge. However, it will be understood that one could also use a solid or relatively solid bottom with the main portion of the filtering occurring at the portion adjacent the trailing ends of the side members. Preferably, the filtering means is of a flexible mesh material suitable for being shipped, along with the side members and handle, in a relatively small space.

The precise location of the filtering means adjacent the trailing ends of the side members may vary from the filtering means being located at the extremity to a point intermediate the trailing ends and the meeting ends. An advantage of the filtering means being located intermediate the leading and trailing ends is that a somewhat greater stability is provided to the device when the water is somewhat choppy or rough such as when people occupy the pool and/or when winds are disturbing the surface. It will be understood that the precise orientation of the rear filtering means may vary from a substantially vertical orientation to one which is angled less or greater than 90° with respect to the horizontal.

The horizontal portion of the filtering means, as aforementioned, is preferably located between the top and bottom surfaces of the side members to thereby offer a protection thereto particularly when removed from the water. It will be understood that equivalent means for protecting the screen may be employed—protrusion or leg members on the bottom surface of the side members will also function to keep the horizontal portion of the filtering means spaced from the bottom or lower most portion of the device.

The connecting of a floatable skimmer to a fixed point may be accomplished in several different ways. In the preferred embodiment, the connection is such that it will release under a predetermined force which is relatively low. This provides a margin of safety if, for example, a young infant or child should become entrapped in a rope or cable connecting the device to a fixed point. While it is possible to utilize several different means of connections, a convenient means would comprise a plug member which is fitable into a recess and frictionally held therein. The fitting would be designed such that a relatively low force would be sufficient to permit the device to become disconnected.

The device can be utilized with many different types of pools and thus, different types of connections are possible. In one embodiment, one can use a portable member which is adapted to serve as an anchoring point. This portable member could merely sit on some suitable surface and would have means incorporated therewith for receiving the attachment to the device. For example, it is well known to use a hollow base which can be filled with water or other material such as sand and which could then be placed at the side of the pool. The member would have means for receiving the attachment and preferably means for adjustably receiving the same. In a preferred embodiment, the anchoring member will include friction increasing means on a bottom surface thereof. Thus, the bottom surface may conveniently be of a non-smooth nature in order to minimize the possibility of the anchoring member accidently moving. In other words, the bottom surface may be of an abrasive nature.

Although the invention has been described above with respect to a swimming pool, it will be understood that it may equally well be employed with other devices having a generally circular flow of water including, for example, hot tubs, spas, etc.

Also, as previously mentioned, the device can be used in pools or other bodies of water having other than a peripheral flow of water. Wherever any flow of water occurs it will entrain a certain amount of debris and this debris can be filtered. Thus, though the device may not be as efficient in other types of pools, it could still be utilized to capture a certain amount of the debris.

BRIEF DESCRIPTION OF THE DRAWINGS

Having thus generally described the invention, reference will be made to the accompanying drawings illustrating an embodiment thereof:

FIG. 2 is a perspective view of the skimmer device;

FIG. 3 is a top plan view thereof;

FIG. 4 is a front view thereof as seen looking from the bottom of FIG. 3;

FIG. 5 is a sectional view taken along the lines 5—5 of FIG. 3;

DETAILED DESCRIPTION OF THE INVENTION

Figure 1:
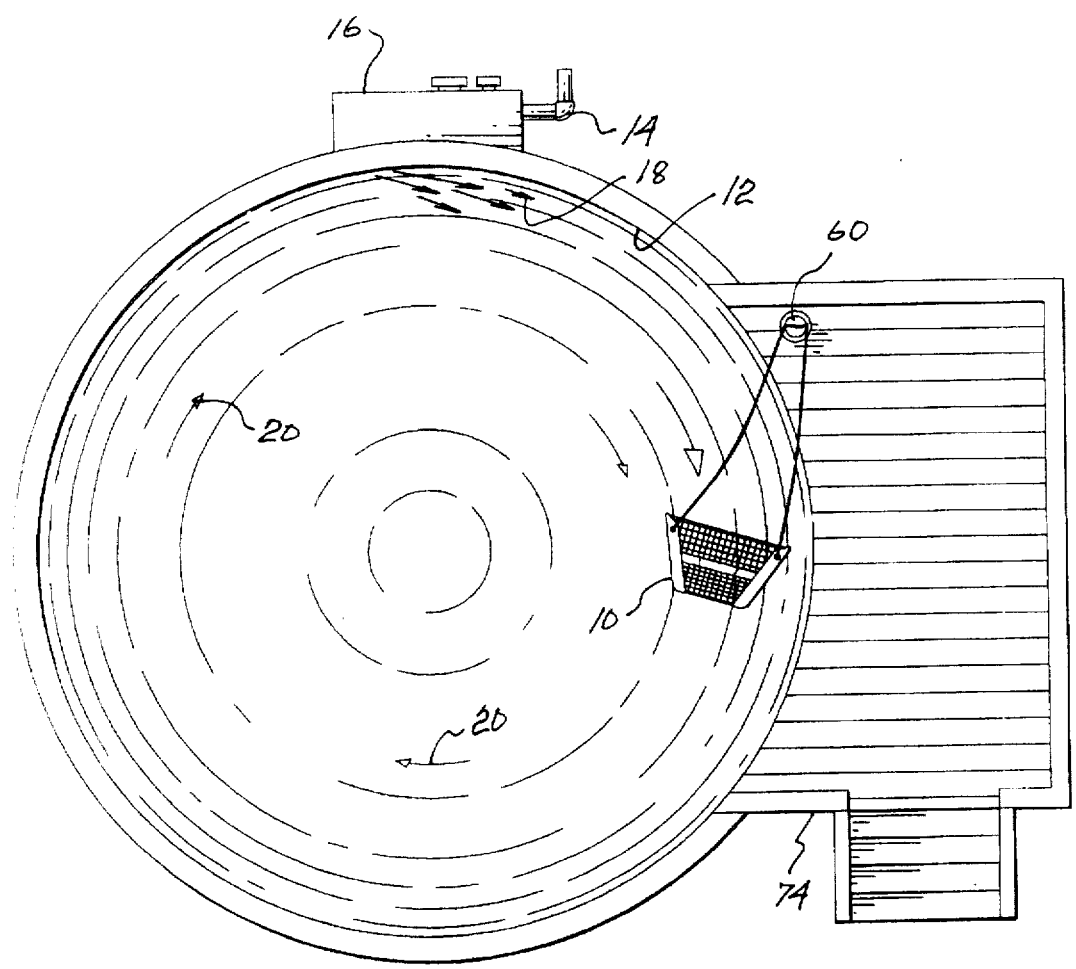
FIG. 1 is a top plan view of a pool showing operation of the skimmer device of the present invention.

Referring to the drawings in greater detail and by reference characters thereto, a typical operating environment of the skimmer device 10 is shown in FIG. 1 where it is placed in a pool having a pool side wall 12 to which a return conduit 14 feeds an inlet structure 16 directing water outwardly into the pools as indicated by arrows 18. This directing of the return water into the pool causes a generally peripheral flow of the water as indicated by arrows 20. It will understood that the above is a very basic arrangement and that more sophisticated installations may be utilized including in ground pools, spas, etc. In almost all these instances, there is a somewhat peripheral flow of water similar to that indicated by arrows 20. The skimmer device 10, as best illustrated in FIGS. 2 to 5, is formed of a first longitudinally extending side member 22 and a second longitudinally extending side member 24. Both side members 22 and 24 are substantially identical and thus, similar reference numerals with a prime will be utilized in describing second longitudinally extending side member 24.

First longitudinally extending side member 22 has an upper surface 26, a lower surface 28, and opposed side surfaces 30 and 32. As will be seen in FIGS. 2 and 3, side wall 32 tapers outwardly as indicated by reference numeral 27 at the leading end thereof.

The arrangement of the first and second longitudinally extending side members 22 and 24 is that they are in a diverging/converging relationship with the leading edges (adjacent tapered walls 27 and 27') being spaced further apart than the trailing ends. As will be seen from the drawings, a handle 34 extends between first longitudinally extending side member 22 and second longitudinally extending side member 24.

The skimmer device includes filtering means comprising a screen member having a horizontal portion 36 and a vertical portion 37. A reinforcing element 38 is provided on the leading edge of the horizontal portion 36 while a reinforcing element 40 is conveniently provided on the upward edge of vertical portion 37.

As seen in detail in FIG. 5, wall 32 of longitudinally extending side member 22 has an inward jog wherein there is provided a groove 44. Engageable in groove 44 is a spline 46 to secure horizontal screen member 36 in place. A similar arrangement is utilized with respect to second longitudinally extending side member 24.

Skimmer device 10 is secured by means of a cord 48 having one end attached to first longitudinally extending side member 22 and a second end attached to second longitudinally extending side member 24. As previously discussed, the use of a cord in a swimming pool or like body of water represents a potential hazard as far as younger children and infants are concerned and accordingly, a detachable connection is desirable. To this end, and referring to FIGS. 3, 4 and 6, recesses 50 and 50' are provided in longitudinally extending side members 22 and 24 respectively. As seen in dotted outline in FIG. 6, a plug member generally designated by reference numeral 52 is insertable into recess 50; plug 52 includes a body portion 54 and an outwardly extending flange 56. Body portion 54 is frictionally engageable with recess 50 such that it will hold the device in the desired position but will release upon a predetermined force being applied thereto. Cord 48 passes through body 54 and is held in position by a retainer ring 58.

Figure 7:
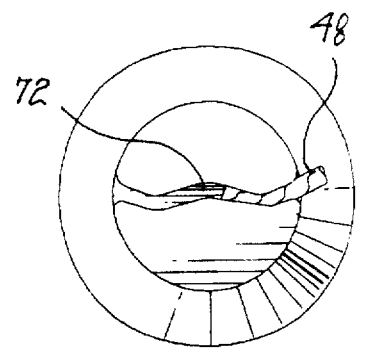
FIG. 7 is a top plan view of an anchoring device suitable for use with the skimmer of the invention.
Figure 8:
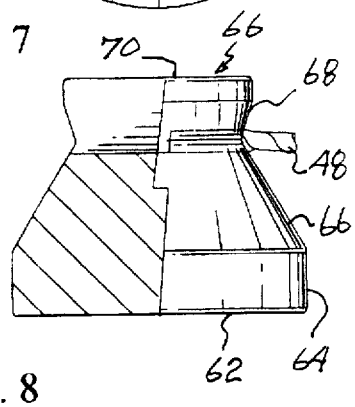
FIG. 8 is a side elevational view, partially in section, of the anchoring device of FIG. 7.
Figure 9:
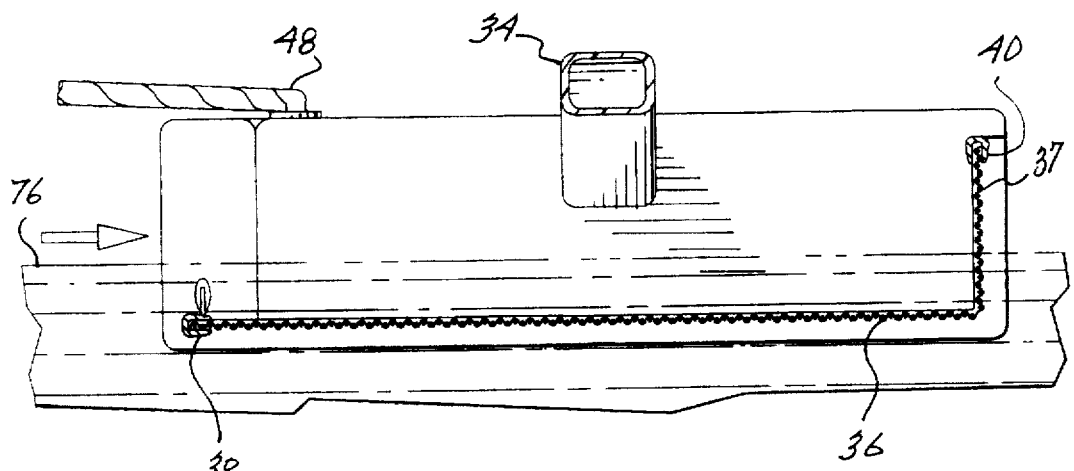
FIG. 9 is a sectional view taken along the length of the device showing operation thereof in the pool.
Figure 10:
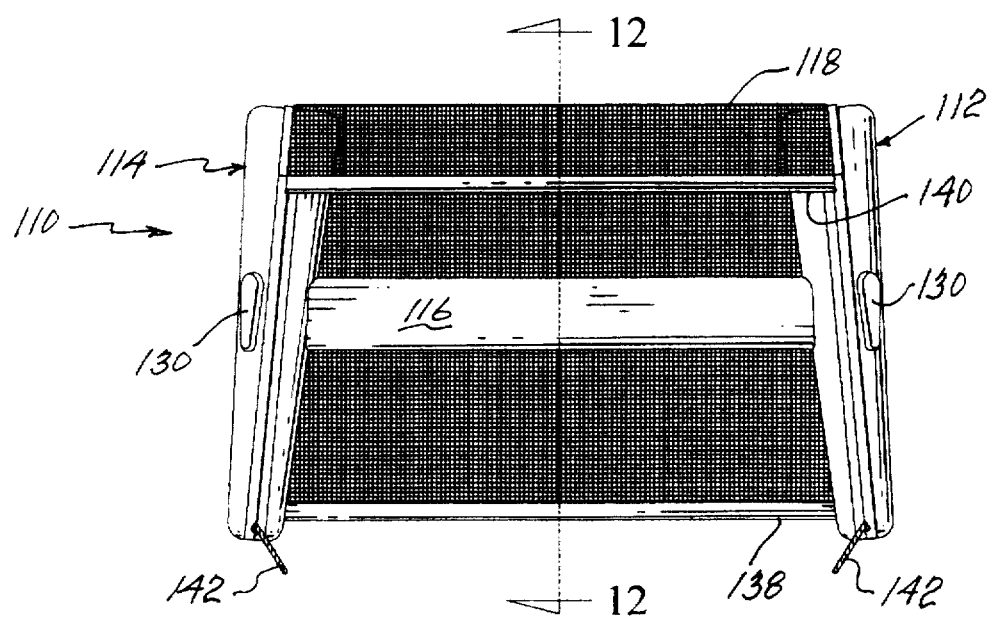
FIG. 10 is a top plan view of a further embodiment of the present invention.
Figure 11:
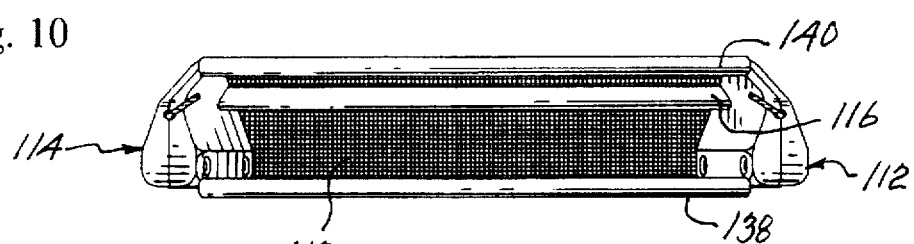
FIG. 11 is a front elevational view thereof.
Figure 12:
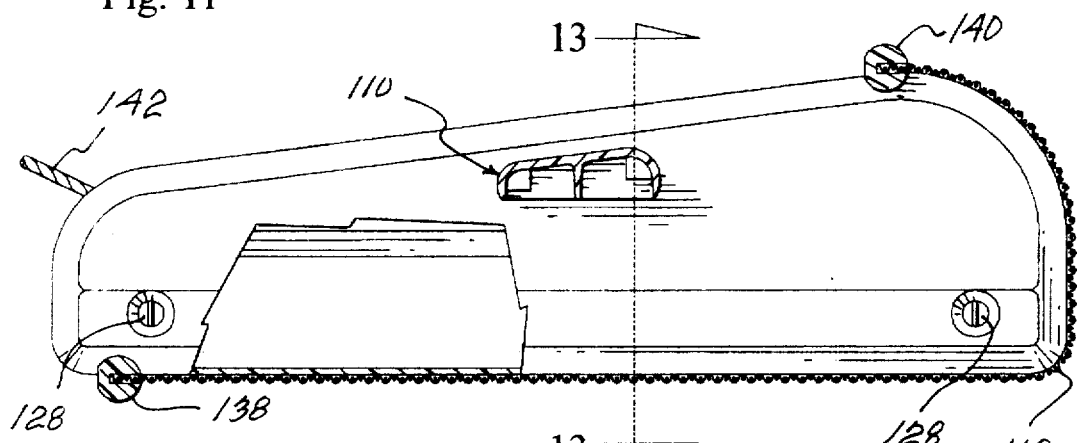
FIG. 12 is a side sectional view taken along the lines 12—12 of FIG. 10.

A preferred means of retaining the device in a desired position may include an anchoring member such as illustrated in FIGS. 7 and 8. Anchoring member has a base 62 which has an abrasive bottom surface with circular side wall 64 extending upwardly therefrom. As an inwardly tapered side wall portion 66 then tapers outwardly as indicated by reference numeral 68 and terminates in an upper surface 70. Upper surface 70 has a serpentine groove 72 formed therein and which groove is sized to frictionally cord 48. Anchoring device 60 may be formed as a solid member or alternatively, may have a hollow interior design to accept a weighting material such as water or sand.

As shown in FIG. 8, the device is held in position such that horizontal screen portion 36 is spaced below the surface 76 of the water. All the floating debris will thus be retained by skimmer device 10.

As will be noted, the non-parallel configuration of the longitudinally extending side members helps to create a drag on the device such that it will position itself properly within the flow of the water. With parallel sides, there would be substantially low drag and extraneous factors such as wind and the like could move the device out of the desired path.

Also, it will be noted that the tapered portion 27 will help to increase both the drag and turbulence at the inlet end such that any material entrapped within the device will tend to remain there again despite external factors such as wind.

In connection with the above, it will be noted that the bottom or lower surface 28 and 28' of first and second longitudinally extending side members 22 and 24 respectively are below the water such that the incoming water will contact side wall 32 and 32' to thereby create the required drag.

As shown in FIG. 5, the side members 22 and 24 function both as the structural portion of the device and as well, provide the desired buoyancy. Thus, the devices may contain air chambers to provide the desired buoyancy such that the horizontal screen portion 36 is retained below the water surface.

Handle 34 is preferably situated such that the center of gravity, in the barely horizontal plane, is situated rearwardly of the handle whereby when the device is picked up, the rear end tends to tilt downwardly. This will assist in retaining any debris in the skimmer device. This can be achieved either by locating the handle for the device or through use of the various buoyancy chambers.

The use of anchoring device 60 permits the use of skimmer device 10 in a number of different situations. Thus, as shown in FIG. 1, anchoring device 60 may be placed on a deck surface 76 or on any other suitable surface. The use of this anchoring device could also function as a supplementary safety device in that if excessive force is exerted on skimmer 10, anchoring device 60 will turn and cord 48 can release from groove 72.

Figure 6:
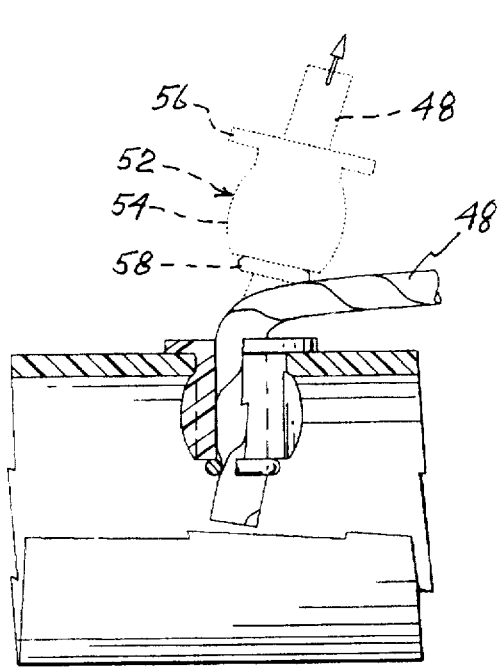
FIG. 6 is a sectional view taken along the lines 6—6 of FIG. 4.

Still further, the use of a releasable fitting such as shown in FIG. 6 greatly enhances the safety of the device. It is well within the skill of one knowledgeable in the art to engineer a desired release force which provides the desired safety factor while still being great enough to permit proper functioning of the device.

Still further, it will be noted that attachment of horizontal screen portion 36 is above that of lower surface 28 so as to prevent damage to the screen when the device is removed from the aqueous environment and placed on a solid surface.

Turning now to the embodiment illustrated in FIGS. 10 to 13, there is provided a skimmer device which is generally designated by reference numeral 110. Skimmer device 110 includes a first side member 112, a second side member 114, a handle or cross frame member 116 extending between side members 112, 114, and a screen 118.

Figure 13:
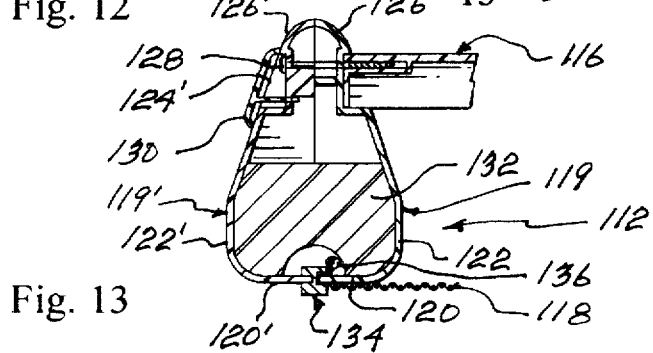
FIG. 13 is a sectional view taken along the lines 13—13 of FIG. 12.

Each of side members 112 and 114 are substantially identical and thus, only one will be described in detail. Referring to FIG. 13, member 112 is comprised of a pair of half shells 119 and 119'. Again, each half shell is substantially identical and thus, similar reference numerals with a prime will be employed for similar components.

Half shell 119' has a base portion 120', a side wall 122' and an upper arcuate wall section 126'. Formed within side wall 122' is a mortise or recess 124'. Half shells 119 and 119' are held together by means of screws 128. As shown in FIG. 13, handle 116 is adapted to fit within mortise 124 of half shell 119 while a cover 130 is adapted to cover unused mortise 124' associated with half shell 119'.

A buoyant foam material 132 may be used in the interior of side members 112 and 114 to give the desired buoyancy thereto.

As may be seen in FIG. 13, an H shaped connecter may be utilized to connect bottom walls 120' and 120 of half shells 119' and 119 respectively. H shaped connecter 134 receives the free end walls while screen or mesh 118 is adapted to be retained therein. To this end, a slight thickening or piping member 136 may be employed along the side of screen 118.

A reinforcing member 138 may be provided on the leading edge of screen 118 while a similar member 140 may be provided on the trailing or back edge thereof. A cord 142 is provided for holding the skimmer in a desired position.

In this embodiment, the device may be shipped in a knock down or kit form due to the ease of assembly. Thus, the half shells 119 and 119' may be assembled with mesh or screen 118 being retained as shown in FIG. 13. The leading and trailing edges of the screen may be retained by a notch or depression formed within the shell and the screen tensioned in the longitudinal direction. The notch in the shells will hold the screen during the tensioning process. H-shaped connector can then be used to retain the screen 118 during the assembly operation. A similar process would be utilized for tensioning the other side associated with side member 114. Screws 128 may then be inserted to maintain the half shells together.

Subsequently, handle or cross frame member 116 would be inserted to fit within the mortises formed in the side walls of the half shells. In this respect, handle 116 is sized to have a length slightly greater than the length of the relaxed or untensioned screen. Insertion of handle 116 will cause a tensioning of the screen in the transverse direction. The tenon and mortise arrangement of the handle and side members also adds the desired degree of rigidity to the device.

It will be noted that side members 112 and 114 have a greater width in the rearward direction. This is to add a greater buoyancy at the rear of the device such that when heavier debris such as leaves are accumulated, the device is able to support the same.

It will also be noted that H shaped member 134 can be sized so as to become a spacer which prevents the screen member contacting the ground when the device is out of the water to thereby eliminate abrasion.

A further feature of the embodiment shown in FIGS. 10 to 13 is the arrangement whereby the screen has a horizontal portion, a rear vertical portion and extends forwardly so as to fully retain any debris when the device is lifted from the water while still allowing drainage.

It will be understood that the above described embodiments are for purposes of illustration only and that changes and modifications may be made thereto without departing from the spirit and scope of the invention.

I claim:

1. A skimmer device for use in a body of water wherein a flow of water occurs, the device comprising first and second longitudinally extending side members, each side member having a leading end, a trailing end, an upper surface and a lower surface, said side members defining a water inlet between said leading ends and a water outlet between said trailing ends, filter means extending between said side members such that water passing from said water inlet to said water outlet passes through said filter means, said filter means including a screen member having a horizontal portion extending between said side members for a substantial portion of the length of said side members, said horizontal portion being located intermediate said upper surface and the lowermost portion of said side members and being located such that when said device is placed in said body of water, said horizontal portion will lie in a plane below the water level and above said lowermost portion of said side members.

2. The device of claim 1 wherein said horizontal portion of said screen member includes a reinforcing element on a leading edge thereof.

3. The device of claim 1 wherein said leading edges of said side members are spaced apart a greater distance from each other than said trailing ends, said leading ends having an inwardly tapered configuration on a side thereof adjacent said water inlet, said inwardly tapered configuration providing increased turbulence to retain debris between said side members, means interconnecting said first and second side members, and connecting means for connecting the device to a fixed point.

4. The device of claim 1 including a handle member extending between and interconnecting said side members, said handle member being located forward of the center of gravity of said device and rearwardly of said leading ends of said side members such that when said device is lifted from said body of water, said trailing ends of said side members will tend to tilt downwardly to retain debris therein.

5. The device of claim 1 wherein said screen member has a vertical portion rearwardly of said horizontal portion, said vertical portion extending upward and arcuately forward to thereby assist said screen member to retain debris when moved.

6. The device of claim 1 wherein said handle fits within a mortise formed within each of said longitudinal side members, said handle being sized so as to tension said screen.

7. A skimmer device for use in a body of water wherein a flow of water occurs, the device comprising first and second longitudinally extending side members, each side member having a leading end, a trailing end, an upper surface and a lower surface, said side members defining a water inlet between said leading ends and a water outlet between said trailing ends, filter means extending between said side members such that water passing from said water inlet to said water outlet passes through said filter means, means interconnecting said first and second side members, and connecting means for connecting the device to a fixed point comprising first and second interconnecting portions which are frictionally engageable and which are designed to disconnect under a predetermined relatively low force.

8. The device of claim 7 wherein said connecting means comprises a first interconnecting portion having a recess formed therein, and a second portion comprising a plug member designed to frictionally fit within said recess and being designed to withdraw from said recess under said predetermined force.

9. The device of claim 7 wherein said filter means comprises a screen filter means having a rear vertical portion extending between said side members, said vertical portion extending upwardly a sufficient distance such that when said device is placed in said body of water, said rear vertical portion will extend above the water level, said rear vertical portion being spaced forwardly of the trailing ends of said side members.

10. The device of claim 7 wherein said means for connecting the device to a fixed point comprises a cord adapted to attach said device to a fixed point and means for securing said cord to said fixed point in an adjustable manner.

11. The device of claim 7 including a handle member extending between and interconnecting said side members, said handle member being located rearwardly of the leading ends of said side members, said side members being constructed and arranged to provide flotation for said device.

12. The device of claim 7 wherein each of said first and second side members has a greater buoyancy adjacent a rear portion thereof.

13. The device of claim 12 wherein each of said first and second side members has a generally outwardly tapered configuration to have a greater width at said trailing end compared to said leading end to thereby provide said greater buoyancy.

* * * * *